United States Patent [19]

Nagano

[11] Patent Number: 5,373,918
[45] Date of Patent: Dec. 20, 1994

[54] CLAMP STRUCTURE FOR CONNECTING A BRAKE CONTROL CABLE TO A BRAKE CALIPER

[75] Inventor: Masashi Nagano, Izumi, Japan
[73] Assignee: Shimano Inc., Osaka, Japan
[21] Appl. No.: 966,384
[22] Filed: Oct. 26, 1992

[30] Foreign Application Priority Data

Oct. 30, 1991 [JP] Japan .................. 3-089196

[51] Int. Cl.$^5$ .............................. B62L 1/14
[52] U.S. Cl. .................. 188/24.21; 188/24.19
[58] Field of Search .......... 188/24.11, 24.12, 24.19, 188/24.21, 24.22, 73.32, 73.34, 250 F

[56] References Cited

U.S. PATENT DOCUMENTS

| | | | |
|---|---|---|---|
| 4,718,521 | 1/1988 | Hosokawa | 188/24.19 |
| 5,058,450 | 10/1991 | Yoshigai | 188/24.12 X |

FOREIGN PATENT DOCUMENTS

| | | | |
|---|---|---|---|
| 0706538 | 6/1931 | France | 188/24.11 |
| 882643 | 7/1943 | France . | |
| 56-18431 | 4/1981 | Japan . | |
| 61-133487 | 8/1986 | Japan . | |
| 62-187990 | 11/1987 | Japan . | |

*Primary Examiner*—Andres Kashnikow
*Assistant Examiner*—Josie A. Ballato
*Attorney, Agent, or Firm*—Dickstein, Shapiro & Morin

[57] ABSTRACT

A bicycle brake apparatus comprising a pair of brake calipers each attached to a bicycle frame to be pivotable about a first axis, and a connecting structure for connecting one of the brake calipers to a brake control cable. Each brake caliper includes a proximal region pivotally attached to the bicycle frame, a brake pad mounting region for supporting a brake pad, and an arm region extending from the brake pad mounting region. The connecting structure includes a control cable receiving surface formed on the arm region of one of the brake calipers, and a cable clamp for engaging the control cable receiving surface. The cable clamp is movable along a second axis extending substantially parallel to the arm region of this brake caliper to fixedly hold the brake control cable between the control cable receiving surface and the cable clamp. The second axis extends substantially perpendicular to the first axis and in a direction outwardly and upwardly of the bicycle.

23 Claims, 2 Drawing Sheets

CLAMP STRUCTURE FOR CONNECTING A BRAKE CONTROL CABLE TO A BRAKE CALIPER

BACKGROUND OF THE INVENTION

1. Field of the Invention

The present invention relates to bicycle brakes, and more particularly to a structure for connecting a brake control cable to a brake caliper having a brake pad.

2. Description of the Related Art

A conventional bicycle brake includes a pair of brake calipers having brake pads and pivotably attached to a bicycle frame. The brake calipers are connected through a connecting mechanism to a brake control cable operable by a brake lever. The connecting mechanism is adjustable to determine a position of the control cable relative to the brake calipers, thereby to adjust positions of the brake calipers relative to a wheel.

One such construction is disclosed in Japanese Utility Model Publication Kokai No. 1987-187990. In the published prior construction, one of the brake calipers includes a cable clamping screw having an axis extending parallel to a pivotal axis of this caliper.

With the axis of the cable clamping screw extending parallel to the pivotal axis of the brake caliper, the caliper also tends to pivot under a force applied to turn and tighten the clamping screw in adjusting the position of the control cable. It is therefore necessary to turn the brake caliper when adjusting the cable clamping screw.

SUMMARY OF THE INVENTION

An object of the present invention is to provide a brake control cable connecting mechanism for allowing positional adjustment of a control cable relative to a brake caliper without turning the caliper.

Another object of the invention is to provide a brake control cable connecting mechanism for facilitating positional adjustment of a control cable by allowing an adjusting operation to be carried out at an upper outward position of a bicycle.

The above object is fulfilled, according to the present invention, by a bicycle brake apparatus comprising a pair of brake calipers each attached to a bicycle frame to be pivotable about a first axis, and a connecting device for connecting one of the brake calipers to a brake control cable.

Each brake caliper includes a proximal region pivotally attached to the bicycle frame, a brake pad mounting region for supporting a brake pad, and an arm region extending from the brake pad mounting region. The connecting device includes a control cable receiving surface formed on the arm region of one of the brake calipers, and a cable clamp for engaging the control cable receiving surface. The cable clamp is movable along a second axis extending substantially parallel to the arm region of this brake caliper to fixedly hold the brake control cable between the control cable receiving surface and the cable clamp. The second axis extends substantially perpendicular to the first axis and in a direction outwardly and upwardly of the bicycle.

According to the above construction, the axis of the wire clamp is perpendicular to the axis about which one of the brake calipers is pivotable. This allows the control cable to be positionally adjusted relative to the brake caliper without turning the latter.

Further, since the axis of the wire clamp extends outwardly and upwardly of the bicycle, access may be made to the wire clamp with ease to facilitate positional adjustment of the brake caliper.

Further and other objects, features and effects of the invention will become more apparent from the following more detailed description of the embodiment of the invention taken with reference to the accompanying drawings.

DETAILED DESCRIPTION OF THE PREFERRED EMBODIMENT

An embodiment of the present invention will be described hereinafter with reference to the drawings.

Figure 1:
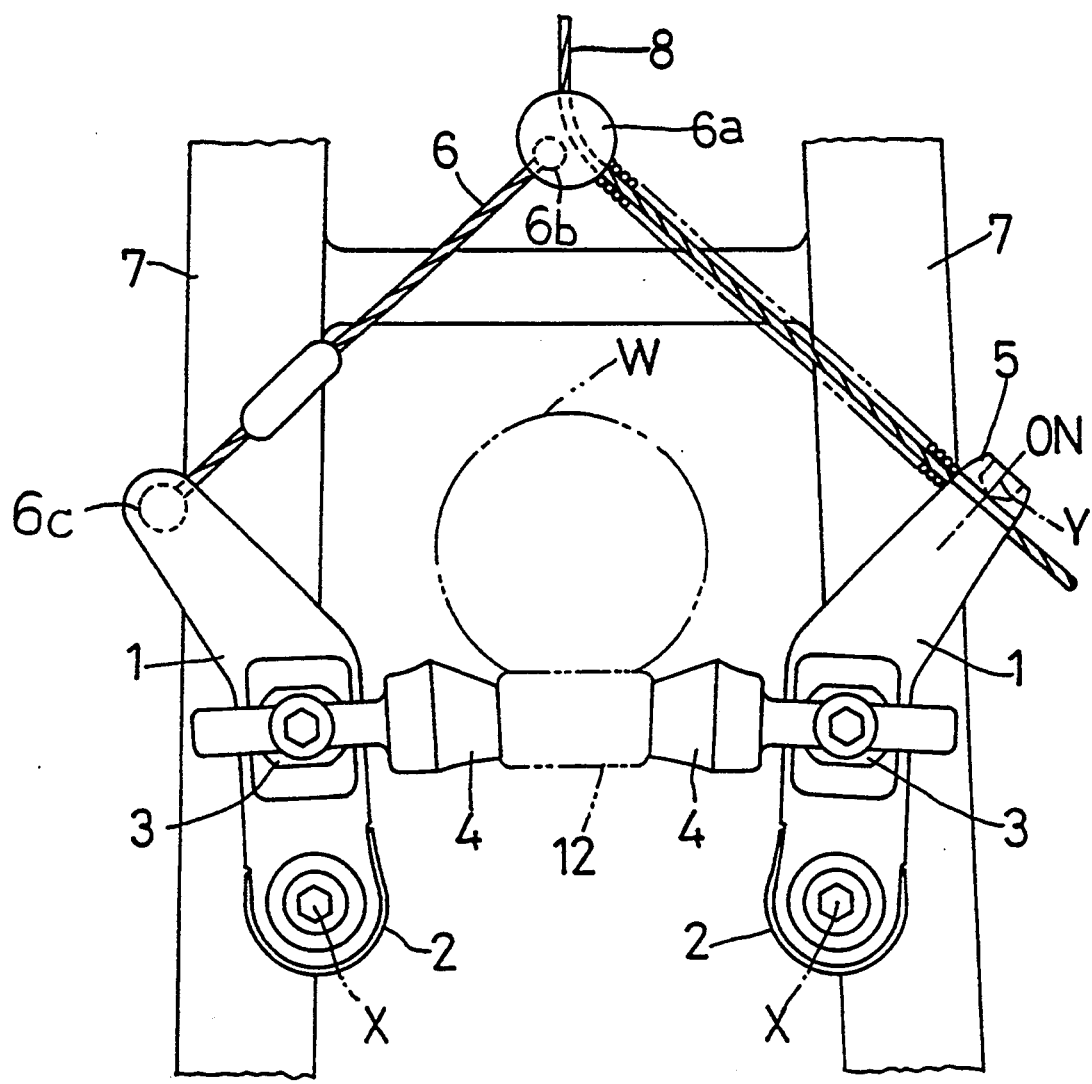
FIG. 1 is a view showing a principal portion of a cantilever type caliper brake.

FIG. 1 shows a cantilever type caliper brake of a bicycle. This brake includes a pair of brake calipers 1 attached to a bicycle frame 7. Each of the brake calipers 1 is pivotable relative to the frame 7 about an axis X. Each brake caliper 1 has a spring case 2 in a proximal portion thereof, and a mounting element 3 in an intermediate portion for supporting a brake pad 4. One of the brake calipers 1 includes a clamping screw 5 for connecting a brake control cable 8 thereto. The other brake caliper 1 includes a stopper 6c for securing a connecting cable 6 thereto. As seen in FIG. 1, each brake caliper 1 has a portion from the spring ease 2 to the mounting element 3 extending substantially parallel to the frame 7, and a portion from the mounting element 3 to the clamping screw 5 or stopper 6c extending outwardly and upwardly of the bicycle.

Figure 4:
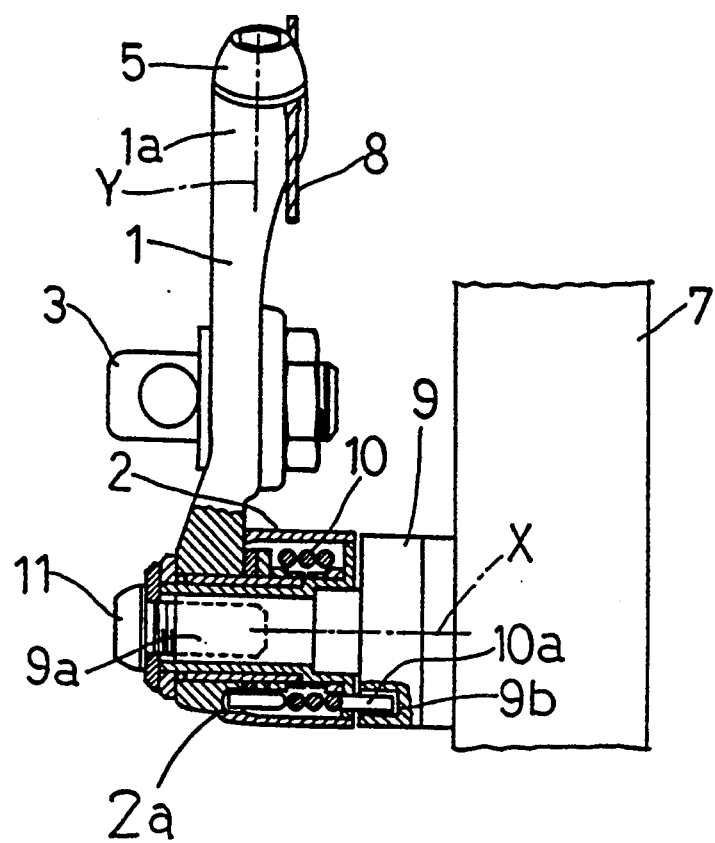
FIG. 4 is a sectional view of a proximal end structure of a brake caliper.

As shown in FIG. 4, the spring case 2 is attached to a brake bracket 9 formed on the frame 7. The bracket 9 includes a support shaft 9a, and the spring ease 2 is rotatably attached to the support shaft 9a by a screw 11. The spring ease 2 contains a coil type return spring 10. The return spring 10 has one end thereof fitted in a mounting hole 2a defined in the spring ease 2, and the other end fitted in a mounting hole 9b defined in the bracket 9.

Figure 3:
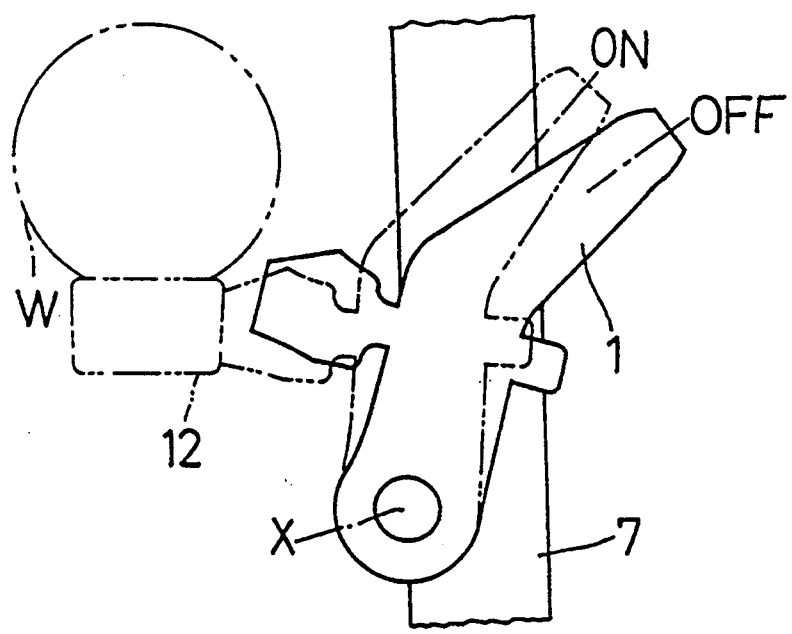
FIG. 3 is a schematic view, with details omitted for simplicity, showing a brake pad on a brake caliper retracted from a wheel rim.

The brake caliper 1 is biased by the return spring 10 to a non-braking position (OFF) as shown in FIG. 3.

As shown in FIG. 1, the brake control cable 8 extends through a cable joint 6a to be connected to one of the brake calipers 1 by the cable clamping screw 5. The cable joint 6a is connected to the other brake caliper 1 through the connecting cable 6 having cable stoppers 6b and 6c.

The control cable 8 is operable by a brake lever (not shown) to cause each brake caliper 1 to pivot about the axis X from the non-braking position OFF to a braking position ON shown in FIG. 3. This moves the brake pad 4 into contact with a rim 12 of a wheel W.

Upon relaxation of the control cable 8, each brake caliper 1 returns to the non-braking position OFF under the biasing force of the return spring 10.

Figure 2:
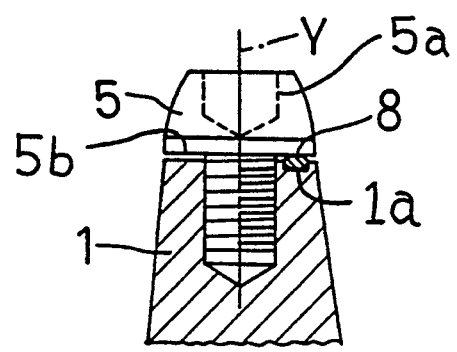
FIG. 2 is a sectional view of a control wire clamping structure according to the present invention.

As shown in FIG. 2, the cable clamping screw 5 has an axis Y, and is meshed with a free end of the brake caliper 1. The axis Y extends substantially perpendicular to the axis X. The clamping screw 5 has a head defining a hexagon socket 5a for receiving a spanner, and a clamping surface 5b for clamping the control cable 8. The clamping surface 5b may be formed of metal or a hard elastic material such as plastic. The surface 5b may be a flat surface or an undulating surface. The clamping screw 5 is tightened with the control cable 8 held between the clamping screw 5 and a linear groove 1a formed in the brake caliper 1, thereby fixing the control cable 8 to the brake caliper 1.

The cable clamping screw 5 may have a hexagonal head to be tightened with a spanner, instead of the head defining the socket 5a.

As shown in FIG. 1, each brake caliper 1 extends substantially straight upward from the axis X to the mounting element 3, and from the mounting element 3 outwardly and upwardly of the frame 7. Consequently, the clamping screw 5 has the axis Y extending in a direction to allow easy access when positionally adjusting the control cable 8 relative to the brake caliper 1.

Further, an extension line from the axis Y passes through a position between the axis X and rim 12. Thus, for adjusting the position of the control cable 8, the clamping screw 5 may be tightened while pushing the screw 5 with a spanner along the axis Y against the biasing force acting to move the brake caliper 1 away from the rim 12.

Since the axis Y of the clamping screw 5 extends substantially perpendicular to the axis of the brake caliper 1, the caliper 1 does not turn while the clamping screw 5 is turned for adjustment. This facilitates positional adjustment of the control cable 8 relative to the brake caliper 1.

I claim:

1. A bicycle brake apparatus comprising:
   brake caliper means attached to a bicycle frame to be pivotable about a first axis, said brake caliper means including a proximal region pivotally attached to said bicycle frame, a brake pad mounting region adjacent to said proximal region for supporting a brake pad, and an arm region extending outwardly and upwardly from said brake pad mounting region, said brake pad mounting region being positioned on a front face of said brake caliper means, normal to said first axis, for adjustably attaching said brake pad;
   bias means for applying a bias force on said brake caliper means in a first direction away from a wheel of said bicycle; and
   connecting means provided on only one side of said bicycle for connecting said brake caliper means to a brake control cable, said connecting means including:
   a control cable receiving surface integrally formed on said arm region and being substantially normal to a second axis which is substantially perpendicular to said first axis, and
   a cable clamp for engaging said control cable receiving surface, said cable clamp being movable, in response to an applied force having a second direction opposite said first direction, along said second axis extending substantially parallel to said arm region to fixedly hold said brake control cable between said control cable receiving surface and said cable clamp, said second axis extending in a direction outwardly and upwardly of said only one side of said bicycle, thereby causing said applied force to generate a torque acting counter to said bias force.

2. A bicycle brake apparatus as defined in claim 1, wherein said cable clamp includes a screw for engaging a threaded hole formed in said control cable receiving surface.

3. A bicycle brake apparatus as defined in claim 2, wherein said screw has a head defining a polygonal socket for receiving a tool to turn said screw.

4. A bicycle brake apparatus as defined in claim 2, wherein said screw has a polygonal head for engaging a tool to turn said screw.

5. A bicycle brake apparatus as defined in claim 4, wherein said control cable receiving surface defines a linear groove for guiding said brake control cable.

6. A bicycle brake apparatus as defined in claim 1, wherein said brake caliper means has a portion from said proximal region to said brake pad mounting region extending substantially along said frame, and a portion from said brake pad mounting region to said arm region extending outwardly and upwardly of said frame.

7. A bicycle brake apparatus as defined in claim 1, wherein said cable clamp has a shape corresponding to said surfaces of said arm region.

8. A bicycle brake apparatus as defined in claim 1, wherein said cable clamp includes a cable pressing surface for contacting said brake control cable.

9. A bicycle brake apparatus as defined in claim 8, wherein said cable pressing surface is formed of metal.

10. A bicycle brake apparatus as defined in claim 8, wherein said cable pressing surface is formed of an elastic material.

11. A bicycle brake apparatus as defined in claim 1, wherein said bias means comprises a coil spring which biases said brake caliper means to move said brake pad away from a wheel rim of the bicycle.

12. A bicycle brake apparatus as defined in claim 11, wherein an extension line from said second axis passes through a position between said first axis and said wheel rim, whereby said applied force is applied to said cable clamp along said second axis to produce said torque which acts counter to the biasing force of said coil spring.

13. A bicycle brake apparatus as defined in claim 1, wherein said brake arm region is of a block configuration extending along said second axis and wherein a threaded hole is provided along said second axis.

14. A bicycle brake apparatus comprising:
    brake caliper means attached to a bicycle frame of a bicycle to be pivotable about a first axis, said brake caliper means including a proximal region pivotally attached to said bicycle frame, a brake pad mounting region adjacent to said proximal region for supporting a brake pad, and an arm region extending from said brake pad mounting region;
    a coil spring coupled to said proximal region of said brake caliper means, said coil spring exerting a bias force on said brake caliper means in a direction away from a wheel rim of the bicycle;
    connecting means for connecting said brake caliper means to a brake control cable, said connecting means including:
    a control cable receiving surface integrally formed on said arm region and being substantially normal to a second axis which is substantially perpendicular to said first axis, and
    a cable clamp for engaging said control cable receiving surface, said cable clamp being movable along said second axis extending substantially parallel to said arm region to fixedly hold said brake control cable between said control cable receiving surface and said cable clamp, said second axis extending in a direction outwardly and upwardly of said bicycle, wherein an extension line from said second axis passes through a position between said first axis and said wheel rim, whereby a force applied to said cable clamp along said second axis produces a torque acting counter to said bias force of said coil spring.

15. A bicycle brake apparatus as defined in claim 14, wherein said cable clamp includes a screw for engaging a threaded hole formed in said control cable receiving surface.

16. A bicycle brake apparatus as defined in claim 15, wherein said screw has a head defining a polygonal socket for receiving a tool to turn said screw.

17. A bicycle brake apparatus as defined in claim 15, wherein said screw has a polygonal head for engaging a tool to turn said screw.

18. A bicycle brake apparatus as defined in claim 17, wherein said control cable receiving surface defines a linear groove for guiding said brake control cable.

19. A bicycle brake apparatus as defined in claim 14, wherein said brake caliper means has a portion from said proximal region to said brake pad mounting region extending substantially along said frame, and a portion from said brake pad mounting region to said arm region extending outwardly and upwardly of said frame.

20. A bicycle brake apparatus as defined in claim 14, wherein said cable clamp has a shape corresponding to side surfaces of said arm region.

21. A bicycle brake apparatus as defined in claim 14, wherein said second axis extends substantially perpendicular to said brake control cable.

22. A bicycle brake apparatus as defined in claim 14, wherein said cable clamp includes a cable pressing surface for contacting said brake control cable.

23. A bicycle brake apparatus as defined in claim 14, wherein said brake arm region is a block configuration extending along said second axis and wherein a threaded hole is provided along said second axis.

* * * * *